US006796368B1

(12) United States Patent
Saida et al.

(10) Patent No.: US 6,796,368 B1
(45) Date of Patent: Sep. 28, 2004

(54) AIR CONDITIONING APPARATUS FOR VEHICLE

(75) Inventors: Kazunori Saida, Kariya (JP); Yoshihiko Okumura, Kariya (JP); Hiromi Tahara, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/289,168

(22) Filed: Apr. 9, 1999

Related U.S. Application Data (63) Continuation of application No. PCT/JP98/03586, filed on Aug. 10, 1998.

(30) Foreign Application Priority Data

Aug. 11, 1997 (JP) ............................................. 9-216539

(51) Int. Cl.[7] ........................... F25B 29/00; B60H 1/00; B60H 1/32
(52) U.S. Cl. ........................... 165/43; 165/42; 165/202; 165/913; 62/272; 62/285; 62/426; 454/156
(58) Field of Search ........................... 165/42, 43, 202, 165/913; 62/272, 285, 426; 454/156

(56) References Cited

U.S. PATENT DOCUMENTS

| | | | | |
|---|---|---|---|---|
| 2,808,237 A | * | 10/1957 | Fosnes ........................ | 165/122 |
| 3,008,694 A | * | 11/1961 | Todd ........................... | 165/42 |
| 3,288,048 A | | 11/1966 | Laing | |
| 4,082,142 A | | 4/1978 | Blackburn et al. | |
| 4,874,040 A | * | 10/1989 | Herrmann ................... | 165/122 |
| 5,135,046 A | * | 8/1992 | Becquerel et al. .......... | 165/43 |
| 5,701,949 A | * | 12/1997 | Yamaguchi et al. ......... | 165/43 |
| 5,711,368 A | * | 1/1998 | Ito et al. ...................... | 165/43 |
| 5,715,705 A | * | 2/1998 | Kujirai et al. ................ | 62/528 |
| 5,755,107 A | | 5/1998 | Shirota et al. ................ | 165/43 |
| 5,954,578 A | * | 9/1999 | Takasaki ...................... | 165/42 |

FOREIGN PATENT DOCUMENTS

| | | | | |
|---|---|---|---|---|
| GB | 884918 | * | 12/1961 | ................... 165/42 |
| JP | 56-82628 | * | 7/1981 | |
| JP | 60-183218 | * | 9/1985 | |
| JP | 3-273923 | * | 12/1991 | |
| JP | 4-24491 | * | 1/1992 | ................... 165/148 |
| JP | 5-58143 | * | 3/1993 | |
| JP | 7-266844 | * | 3/1994 | |
| JP | 7-35496 | * | 2/1995 | |
| JP | 7-172144 | * | 7/1995 | |
| JP | 8-104129 | * | 4/1996 | |
| JP | 8-142640 | * | 6/1996 | |
| JP | 8-156570 | * | 6/1996 | |
| JP | A-8-295128 | | 11/1996 | |
| JP | 9-58256 | * | 3/1997 | |
| JP | 9-109658 | * | 4/1997 | |
| JP | 9-123748 | * | 5/1997 | |
| JP | 9-150620 | * | 6/1997 | |
| JP | 9-156342 | * | 6/1997 | |
| JP | A-10-244820 | | 9/1998 | |

OTHER PUBLICATIONS

European Search Report dated Oct. 17, 2002 in EP Application No. EP 98 93 6745.

* cited by examiner

Primary Examiner—John K. Ford
(74) Attorney, Agent, or Firm—Harness, Dickey & Pierce, PLC (57) ABSTRACT

In an air conditioning apparatus where air flows through a cooling heat exchanger (21) upwardly from below, it is an object to improve draining performance of condensed water in the cooling heat exchanger (21). To achieve this object, the cooling heat changer (21) for cooling air is disposed in a case (20) forming an air passage to be inclined by a small angle (θ) from a horizontal direction, the inclination direction of the cooling heat exchanger (21) is the same direction as a longitudinal direction (B) of tubes (21a) through which cooling fluid flows, and the cooling heat exchanger (21) is disposed so that a flow direction (A) of air flowing into a lower side of the cooling heat exchanger (21) is perpendicular to the longitudinal direction (B) of the tubes (21a).

10 Claims, 6 Drawing Sheets

AIR CONDITIONING APPARATUS FOR VEHICLE

This is a continuation of international patent application No. PCT/JP98/03586, filed Aug. 10, 1998.

TECHNICAL FIELD

The present invention relates to an air conditioning apparatus for a vehicle, in which air passes through a cooling heat exchanger upwardly from below.

BACKGROUND ART

In a conventional air conditioning apparatus for a vehicle described in JP-A-9-123748, an evaporator (cooling heat exchanger) 21 is disposed approximately horizontally and air flows through the evaporator 21 upwardly from a lower side thereof, to reduce a size of an air conditioning unit 2.

Figure 6A:
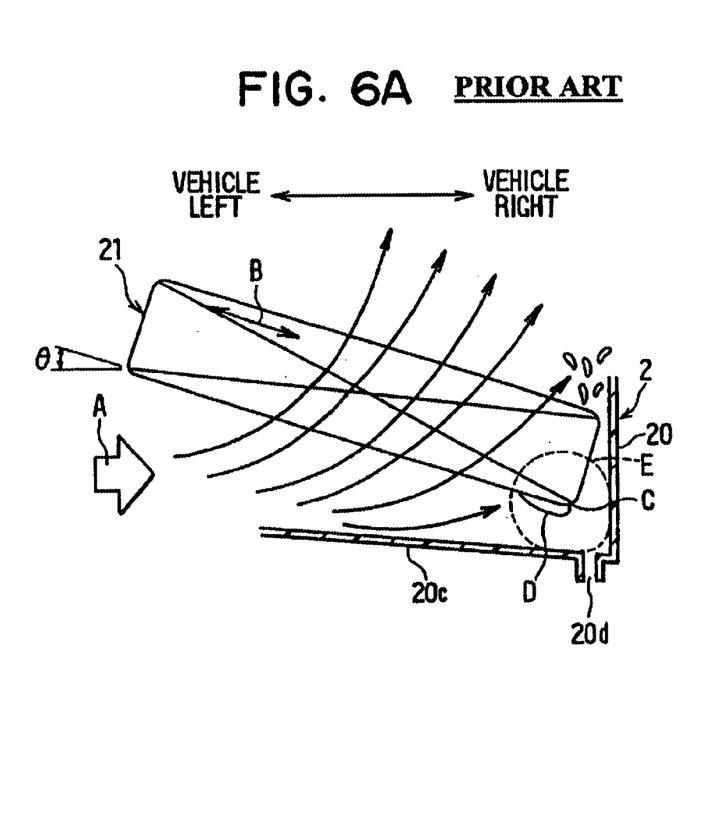
FIGS. 6A, 6B are sectional views of an evaporator in a conventional technology.
Figure 6B:
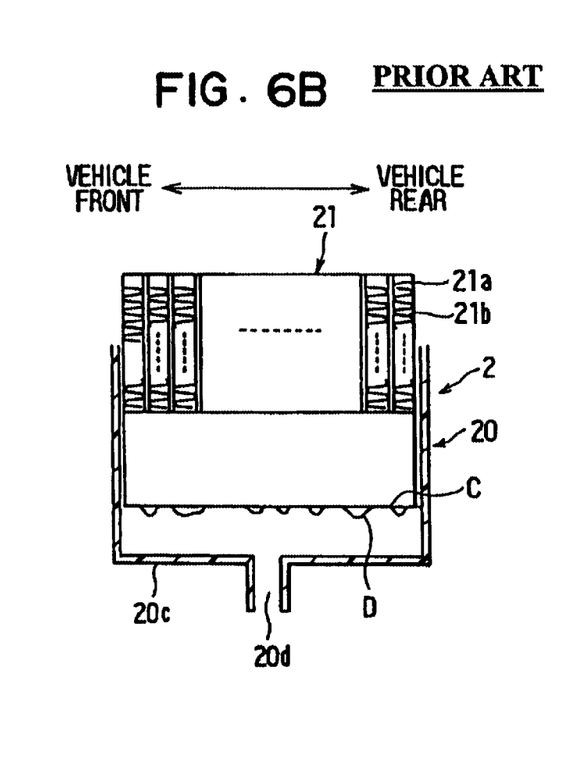

Referring now to FIGS. 6A and 6B, in the conventional apparatus, to improve draining performance of condensed water in the evaporator 21, the evaporator 21 is disposed to be inclined from a horizontal direction by a small angle θ, a flow direction A of air blown by a blower (not shown) toward the lower side of the evaporator 21 is set to a vehicle width direction similarly to an inclination direction of the evaporator 21 and a tube longitudinal direction B of the evaporator 21.

That is, the evaporator 21 is disposed to be inclined downwardly toward a flow forward side of air blown toward the lower side of the evaporator 21, and the longitudinal direction B of tubes 21a forming refrigerant passages in the evaporator 21 extends to the same direction as the flow direction A of blown-air.

Thus, condensed water generated in the evaporator 21 moves on a surface of the tubes 21a toward an inclination lower end portion C of the evaporator 21, due to gravity of condensed water and pressure of blown-air. Condensed water D is collected to the inclination lower end portion C of the evaporator 21, and falls downwardly from the inclination lower end portion C.

However, as a result of an experiment and a study by the inventors of the present invention, the draining performance of condensed water from the evaporator 21 is deteriorated from the following reason.

That is, according to the conventional apparatus, the condensed water D is collected in the inclination lower end portion C of the evaporator 21, and the inclination lower end portion C of the evaporator 21 is placed at an extending inner end of the flow direction A of blown-air. Therefore, main flow (i.e., the air flow having a high air-flow velocity) of blown-air is toward the inclination lower end portion C of the evaporator 21. As a result, a high pressure area E due to main flow of blown-air is formed around the inclination lower end portion C.

Thus, condensed water does not fall and stays between fins 21b by a balance between the gravity of condensed water and air pressure for pushing the condensed water. Further, when the air pressure applied to the condensed water is larger than the gravity of condensed water by a high velocity (Hi) operation of the blower, condensed water may be scattered toward a downstream air side (upper side) of the evaporator 21.

Thus, the draining performance of condensed water is deteriorated as described above. As a result, water contained in air blown into a passenger compartment is increased, and a windshield of the vehicle may be fogged.

DISCLOSURE OF THE INVENTION

In light of the above-described problem, it is an object of the present invention to improve draining performance of condensed water of a cooling heat exchanger, in an air conditioning apparatus for a vehicle where air upwardly passes through the cooling heat exchanger from below.

To achieve the above-described object, in the present invention, a cooling heat exchanger (21) is inclined in the same direction as a longitudinal direction (B) of tubes (21a) of the cooling heat exchanger (21), and the cooling heat exchanger (21) is disposed so that a flow direction (A) of air flowing into a lower side of the cooling heat exchanger (21) is perpendicular to the longitudinal direction (B) of the tubes (21a).

Because the longitudinal direction (B) of the tubes (21a) of the cooling heat exchanger (21) corresponds to the inclination direction of the cooling heat exchanger (21), condensed water generated in the cooling heat exchanger (21) moves along tube surfaces in the longitudinal direction (B) toward an inclination lower end portion (C) of the cooling heat exchanger (21) by gravity of condensed water, and condensed water (D) is collected to the inclination lower end portion (C).

On the other hand, because main flow air (i.e., air having a high flow velocity) blown toward the lower side of the cooling heat exchanger (21) flows into a most inner position within the case (20), a high pressure area (E) due to the main flow air is formed at the most inner position on the lower side of the cooling heat exchanger (21).

Figure 5A:
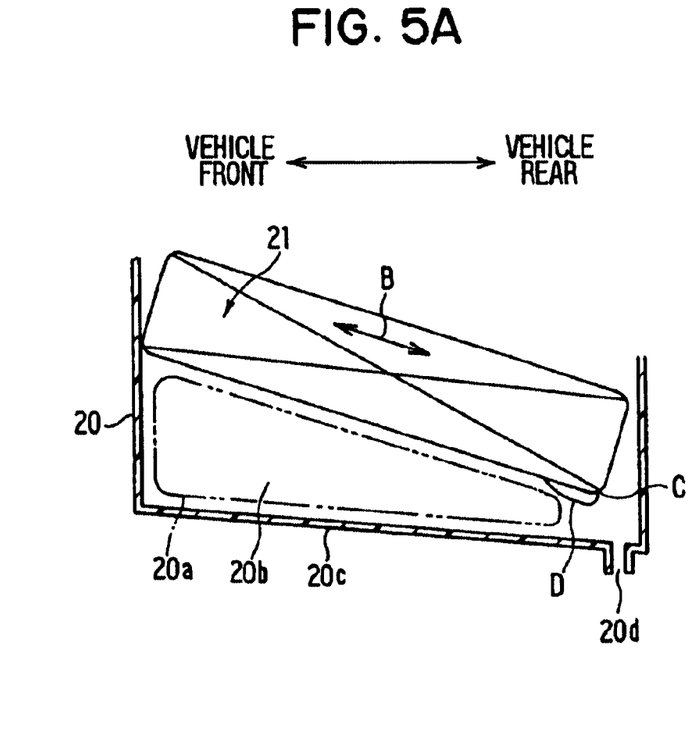
FIGS. 5A, 5B are sectional views of the evaporator in the embodiment.
Figure 5B:
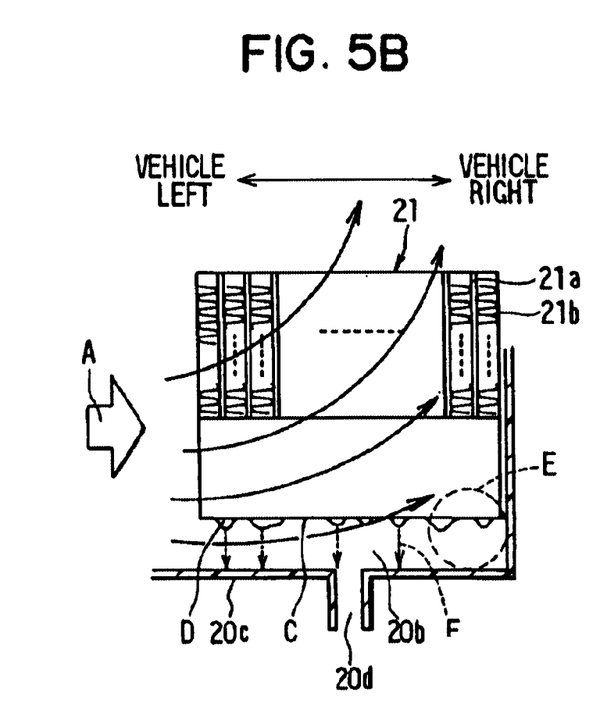

At this time, because a flow direction (A) of air flowing toward a lower side of the cooling heat exchanger (21) is perpendicular to the longitudinal direction (B) of the tubes (21a), the inclination lower end portion (C) of the cooling heat exchanger (21) extends in parallel with the flow direction (A) of air, as shown in FIG. 5B. Therefore, the inclination lower end portion (C) of the cooling heat exchanger (21) corresponds (overlaps) to the high pressure area (E) at a very small part, and almost all of the inclination lower end portion (C) is positioned to be shifted from the high pressure area (E).

Therefore, almost all of the condensed water (D) staying in the inclination lower end portion (C) can fall smoothly downwardly without being pushed by air pressure in the high pressure area (E). As a result, even in the air conditioning apparatus for a vehicle where air passes through the cooling heat exchanger (21) from below upwardly, the draining performance of condensed water can be greatly improved.

In the present invention, the flow direction (A) of air blown toward the lower side of the cooling heat exchanger (21) is in a vehicle width direction, and the longitudinal direction (B) of the tubes (21a) is a vehicle front-rear direction. Therefore, even in a case where the air conditioning apparatus is disposed in a small space of an instrument panel at a front side of a passenger compartment, the perpendicular relation between the flow direction (A) of air and the longitudinal direction (B) of the tubes (21a) can be readily obtained.

Further, in the present invention, the air conditioning apparatus includes a blower unit (1) for blowing air, and an air conditioning unit (2) for adjusting temperature of air blown into the passenger compartment of the vehicle from the blower unit (1). In the air conditioning apparatus, the cooling heat exchanger (21) of the air conditioning unit (2) is disposed to be inclined from a horizontal direction by a small angle (θ) so that air is introduced into the cooling heat exchanger (21) from below and flows upwardly, the cooling heat exchanger (21) is inclined in the same direction as the longitudinal direction (B) of the tubes (21a), and the cooling heat exchanger (21) is disposed so that the longitudinal direction (B) of the tubes (21a) is in the vehicle front-rear direction and the flow direction (A) of air blown from the blower unit (1) into the lower side of the cooling heat exchanger (21) is in the vehicle width direction.

Thus, in the air conditioning apparatus having the blower unit (1) and the air conditioning unit (2), the flow direction (A) of air blown toward the lower side of the cooling heat exchanger (21) is in the vehicle width direction, and the longitudinal direction (B) of the tubes (21a) is in the vehicle front-rear direction. Accordingly, the perpendicular relation between the flow direction (A) of air and the longitudinal direction (B) of tubes (21a) can be obtained. As a result, the draining performance of condensed water can be improved. Further, even when the air conditioning apparatus is disposed in a small space of the instrument panel at a front portion of the passenger compartment, the above-described perpendicular relation can be sufficiently proposed.

In the present invention, the blower unit (1) can be disposed to be shifted to a front passenger's seat side in a front portion of the passenger compartment, and the air conditioning unit (2) can be disposed at a center portion in the front portion of the passenger compartment.

Further, in the present invention, the cooling heat exchanger (21) is disposed to be inclined so that a vehicle front side of the cooling heat exchanger (21) becomes higher and a vehicle rear side thereof becomes lower. Therefore, an interference between the bottom of the case (20) and a vehicle floor which is higher at the vehicle front side can be readily prevented. Further, since the cooling heat exchanger (21) is inclined, an operation space of the air-mixing door (24) can be readily obtained.

Further, in the present invention, a heating heat exchanger (22) for heating air is approximately horizontally disposed on an upper side of the cooling heat exchanger (21) at a vehicle front side so that a bypass passage (23) through which air bypasses the heating heat exchanger (22) is formed at a vehicle rear side of the heating heat exchanger (22). An air mixing door (24) for adjusting a ratio between an amount of air passing through the heating heat exchanger (22) and an amount of air passing through the bypass passage (23) is disposed between the cooling heat exchanger (21) and the heating heat exchanger (22). Further, a face opening portion (28) for blowing air toward an upper side of the passenger compartment is provided on an upper portion of the case (20) at a position of a vehicle rear side.

Thus, within the case (20), an air passage from a downstream air side of the cooling heat exchanger (21) to the face opening portion (28) at the vehicle rear side through the bypass passage at the vehicle rear side can be formed straightly, thereby reducing air flow resistance during a face mode.

In the present invention, the term of "perpendicular" is not limited to the relation where the flow direction (A) of air is crossed with the longitudinal direction (B) of the tubes (21a) by the just 90° angle, but includes the relation where the flow direction (A) of air is crossed with the longitudinal direction (B) of the tubes (21a) by an angle approximately equal to 90°. Similarly, the term of "horizontally" is not limited to the just horizontal direction, but includes an arrangement approximately horizontally.

BEST MODE FOR CARRYING OUT THE INVENTION

Figure 1:
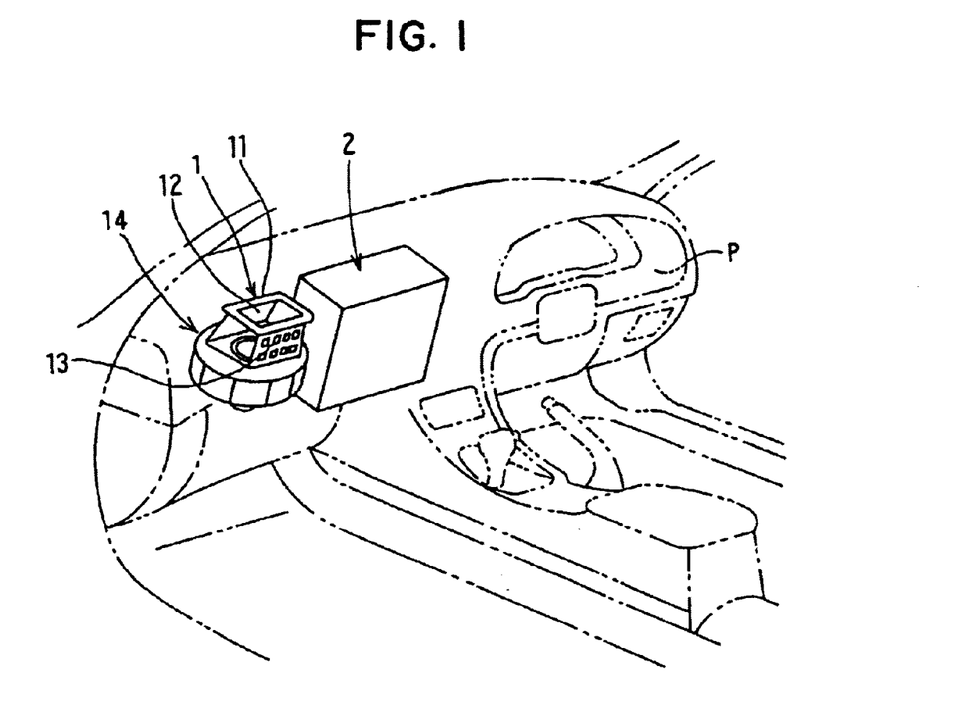
FIG. 1 is a view showing an air conditioning apparatus mounted on a vehicle according to an embodiment of the present invention.

FIG. 1 shows a vehicle attachment state of an air conditioning apparatus of the embodiment. The air conditioning apparatus includes a blower unit 1 and an air conditioning unit 2. The blower unit 1 is disposed at a position shifted from a center portion of an instrument panel P to a front passenger's seat side (i.e., left side of a vehicle width direction in a vehicle having a right steering wheel). On the other hand, the air conditioning unit 2 is disposed at the center portion of the instrument panel P in a front portion of a passenger compartment.

The blower unit 1 has an inside/outside air changeover box 11 in an upper part, for changing over between inside air (i.e., air inside the passenger compartment) and outside air (i.e., air outside the passenger compartment) to be introduced therein. The inside/outside air changeover box 11 is provided with an outside air inlet 12 and an inside air inlet 13, and the outside air inlet 12 and the inside air inlet 13 are opened and closed by an inside/outside air changeover door (not shown).

Figure 2:
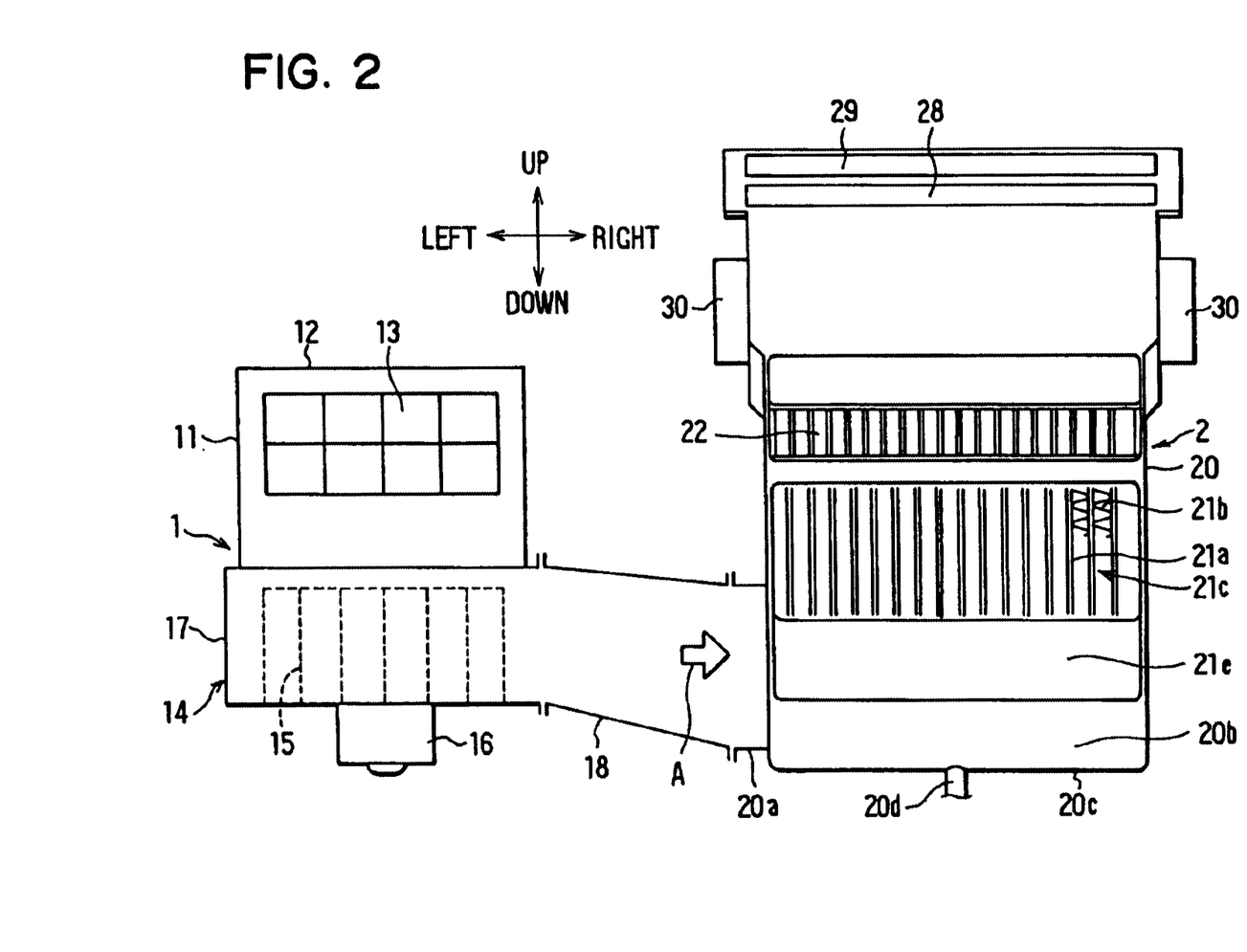
FIG. 2 is a partially sectional front view showing an entire structure of the air conditioning apparatus for the vehicle in the embodiment.

Under the inside/outside air changeover box 11, a blower 14 is disposed as shown in FIG. 2. The blower 14 is comprised of a centrifugal multi-blade fan (sirocco fan) 15, a fan driving motor 16, and a scroll casing 17.

A rotating shaft of the fan 15 is disposed to extend in an approximately vertical direction (i.e., up-down direction of the vehicle). Therefore, with the rotation of the fan 15, air is sucked from the inside/outside air changeover box 11, is introduced into the blower 14 through a bell mouth-shaped suction port provided at the upper part of the scroll casing 17, and is blown in an approximately horizontal direction (i.e., from left to right of the passenger compartment in FIG. 1) towards an outlet of the scroll casing 17.

Figure 3:
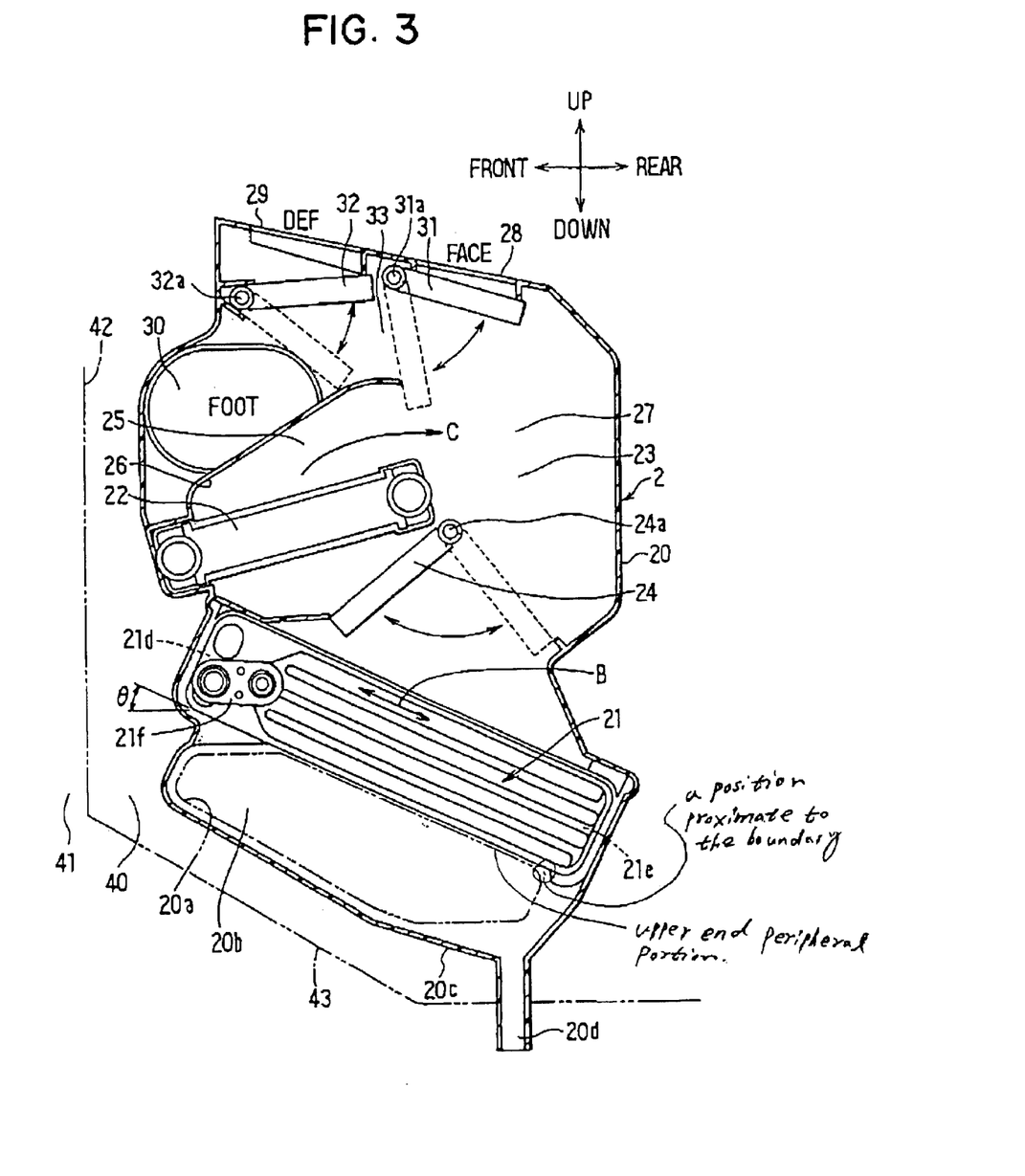
FIG. 3 is a side sectional view of an air conditioning unit in the embodiment.

On the other hand, an air conditioning unit 2 is constructed as shown in FIGS. 2, 3. FIG. 3 is a sectional view when viewed from a left side in FIG. 2. The air conditioning unit 2 includes a case 20 made of resin. The case 20 is formed approximately into a vertical longer box shape, and is constructed by connecting plural division cases to accommodate the components described later.

An air inlet 20a is opened at a lowest position of the case 20 on a side surface of a front passenger's seat side (i.e., vehicle left side). The air inlet 20a has a thin and long flat sectional shape in a vehicle front-rear direction, and is connected to an outlet portion of the scroll casing 17 through a connection duct 18. Therefore, air blown by the fan 17 of the blower 14 flows into the air inlet 20.

An air inlet space 20b into which air from the air inlet 20a flows is formed in the case 20 at the bottom side over an entire length of the case 20 in the vehicle width direction. At an upper side of the air inlet space 20b, an evaporator 21 (i.e., cooling heat exchanger) of a refrigerant cycle is disposed approximately horizontally. Therefore, air blown from the blower unit 1 is introduced into the evaporator 21 from below, and passes through the evaporator 21 upwardly.

Figure 4:
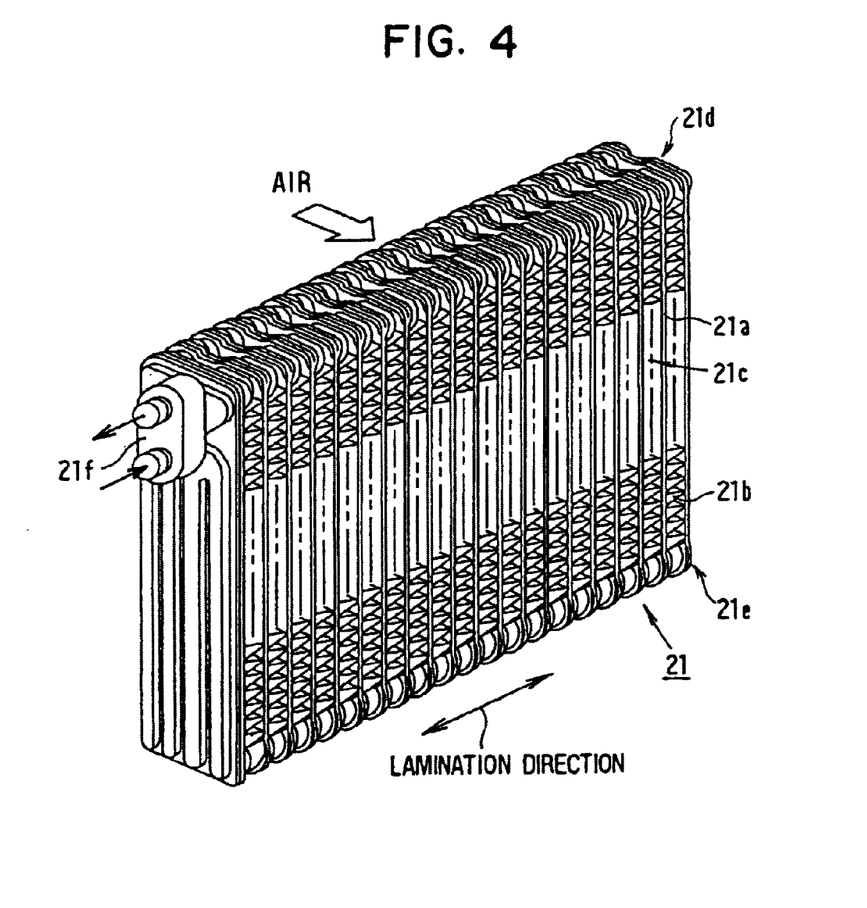
FIG. 4 is a perspective view showing an entire structure of an evaporator in the embodiment.

The structure of the evaporator 21 and an arrangement thereof will be described in detail. FIG. 4 shows the structure of the evaporator 21. The evaporator 21 has a plurality of tubes 21a each of which is formed by connecting a pair anti-corrosive metal sheets (two sheets) such as aluminum sheets. In the evaporator 21, a longitudinal direction of each flat tube 21a is an up-down direction of FIG. 4, and each tube 21a forms a refrigerant passage through which refrigerant flows in the longitudinal direction.

The evaporator 21 is a lamination type in which the tubes 21 is laminated through corrugated fins 21b in a left-right direction of FIG. 4. A core portion 21c is formed by the tubes 21a and the corrugated fins 21b arranged between adjacent tubes 21a. In the evaporator 21, air passes through clearance portions of the core portion 21c to be cooled.

On both opposite ends of the core portion 21c, there are arranged tank portion 21d, 21e for distributing the refrigerant into the tubes 21a and for joining the refrigerant from the tubes 21a. The tank portions 21d, 21e are formed from protruding portions at both ends of the metal sheet forming the tubes 21a. Further, a pipe joint 21f having a refrigerant inlet and a refrigerant outlet is disposed in one end portion (i.e., left end portion of FIG. 4) of the evaporator 21 in a lamination direction of the tubes 21 (i.e., metal sheets). The entire structure of the evaporator 21 is assembled through aluminum-brazing.

As shown in FIG. 3, one side tank portion 21d at a side of the pipe joint 21f is placed at a vehicle front side, and the other side tank portion 21e is placed at a vehicle rear side. Further, the evaporator 21 is inclined relative to a horizontal direction by a small angle $\theta$ (e.g., 25°) so that the tank portion 21d at the vehicle front side becomes higher and the tank portion 21e at the vehicle rear side becomes lower.

Because the evaporator 21 is disposed as described above, the longitudinal direction (refrigerant flow direction) B of the tubes 21a of the evaporator 21 is perpendicular to the air flow direction (paper face-back direction of FIG. 3) A at the lower side of the evaporator 21.

A bottom portion 20C of the case 20 is formed to become lower from the vehicle front side toward the vehicle rear side along the inclination angle $\theta$ of the evaporator 21. A drain pipe 20d is opened in the bottom portion 20c at a lowest position (i.e., a lower side of the inclination lower end portion of the evaporator 21) on the vehicle rear side. The drain pipe 20d can be formed integrally with the bottom portion 20c of the case 20 made of resin, and a drain hose (not shown) is connected to a lower end of the drain pipe 20d. Thus, condensed water falling onto the bottom portion 20c of the case 20 can be discharged to the outside of the vehicle through the drain pipe 20d and the drain hose (not shown) connected to the drain pipe 20d.

A heater core (i.e., heating heat exchanger) 22 is disposed approximately horizontally on a downstream air side of the evaporator 21 at a vehicle front side position. The heater core 22 is inclined by a small angle in a reverse direction with the evaporator 21 so that the vehicle front side of the heater core 22 becomes lower and the vehicle rear side thereof becomes higher. The heater core 22 heats air blown from the evaporator 21 by using an engine-cooling water (hot water) as a heating source. Relative to the heater core 22, a bypass passage 23 is formed at a vehicle rear side.

An air mixing door 24 rotated by a rotation shaft 24a is disposed rotatably between the evaporator 21 and the heater core 22 to adjust a ratio between an amount of warm air heated while passing through the heater core 22 and an amount of cool air passing through the bypass passage 23. The air mixing door 24 functions as temperature adjusting means for adjusting the temperature of air blown into the passenger compartment by adjusting the ratio between the warm air and the cool air.

At the upper portion of the heater core 22 in an air conditioning case 20, a warm air passage 25 through which warm air having passed through the heater core 22 flows from a vehicle front side to a vehicle rear side is formed by a wall portion 26 of the case 25. Warm air from the warm air passage 25 and cool air from the bypass passage 23 are mixed in an air-mixing chamber 27 so that conditioned air having a predetermined temperature is obtained.

A face opening portion 28 is opened on an upper surface portion of the case 20 at a vehicle rear side, and communicates with a face air outlet through which air is blown toward an upper side (the passenger's head side) of the passenger compartment. Here, because the face opening portion 28 is positioned at an upper side (air downstream side) of the evaporator 21 approximately linearly through the bypass passage 23, cool air having passed through the evaporator 21 can be introduced into the face opening portion 28 with small air-flowing resistance, during a maximum cooling operation.

Further, a defroster opening portion 29 is opened on the upper surface portion of the case 20 at a vehicle front side, and the defroster opening portion 29 communicates with a defroster air outlet (not shown) for blowing air toward an inner surface of a front windshield of the vehicle.

Further, a foot opening portion 30 is opened on left and right side surfaces (see FIG. 2) of the case 20, at an immediately upper position of the warm air passage 25, and the foot opening portion 30 communicates a foot air outlet (not shown) for blowing air toward the foot portion of a passenger in the passenger compartment. To open and close the opening portions 28–30, two air-blowing mode switching doors 31, 32 are disposed to be rotated by rotation shafts 31a, 32a respectively.

The air-blowing mode switching door 31 opens and closes the face opening portion 28 and an inlet portion of a communication path 33. The communication path 33 is a common air introducing path through which air from the air-mixing chamber 27 is introduced into both of the defroster opening portion 29 and the foot opening portion 30. On the other hand, the air-blowing mode switching door 32 switches between the communication path 33 and the defroster opening portion 29, and between the communication path 33 and the foot opening portion 30.

In FIG. 3, reference number 40 indicates the passenger compartment, reference number 41 indicates an engine compartment, and reference number 42 indicates a dashboard partitioning the passenger compartment 40 and the engine compartment 41, and reference number 43 indicates a floorboard. The inclination of the bottom portion 20c of the case 20 is also used for preventing an interference with an inclination of the floorboard 43 in the vehicle front-rear direction.

Next, operation of the embodiment of the present invention will be explained. Air from the inside/outside air changeover box 11 of FIGS. 1, 2 flows approximately horizontally within the scroll casing 17 by the fan 15, and flows into the air inlet space 20b at the lower side of the evaporator 21 from the air inlet 20a through the connection duct 18 as shown by arrow A. Thereafter, the flow direction of air is changed to upwardly in the air inlet space 20b, and air is dehumidified and cooled while passing through the evaporator 21 upwardly.

According to the rotation position of the air-mixing door 24, cool air having passed through the evaporator 21 is divided into cool air to be introduced into the heater core 22 and cool air to be introduced into the bypass passage 23. Thereafter, warm air heated in the heater core 22 and cool air from the bypass passage 23 are mixed in the air-mixing chamber 27 so that conditioned air having a predetermined temperature can be obtained. Next, the conditioned air having the predetermined temperature is blown into the passenger compartment through at least one of the face opening portion 28, the defroster opening portion 29 and the foot opening portion 30 switched by the air-blowing mode switching doors 31, 32, so that the passenger compartment is conditioned.

In the arrangement of the air conditioning unit 2, the evaporator 21 is disposed approximately horizontally, and air is blown into the evaporator 21 from below upwardly. Therefore, a falling direction of condensed water is opposite to the air-blowing direction, and it is a problem to improve draining performance of condensed water generated in the evaporator 21.

According to the present invention, by the following structure, the draining performance of the condensed water is improved. That is, as shown in FIG. 3, the evaporator 21 is disposed to be inclined to the same direction as the longitudinal direction B of the tubes 21a by the small inclination angle θ. Preferably, the inclination angle θ of the evaporator 21 is larger than 10° to reduce water amount contained in the evaporator 21. Further, preferably, the inclination angle θ is smaller than 30° to reduce the dimension of the evaporator 21 in the up-down direction.

In addition to the inclination arrangement of the evaporator 21, the evaporator 21 is disposed so that the longitudinal direction B of the tubes 21a is perpendicular to the flow direction A of air blown toward the lower side of the evaporator 21. That is, the flow direction A of air blown toward the lower side of the evaporator 21 is in the vehicle width direction as shown in FIGS. 2, 5B, and the longitudinal direction B of the tubes 21a of the evaporator 21 is in the vehicle front-rear direction as shown in FIGS. 3, 5A.

Thus, main flow air (i.e., the air having a high velocity) blown toward the lower side of the evaporator 21 flows into the most right position in the air inlet space 20b. As a result, a high pressure area E of the main flow air is formed at the most right position in the air inlet space 20b.

On the other hand, because the longitudinal direction B of the tubes 21a is the same as the inclination direction of the evaporator 21, condensed water generated in the evaporator 21 moves along the surfaces of the tubes 21a in the longitudinal direction B of the tubes 21a toward an inclination lower end portion C of the evaporator 21 by gravity of the condensed water, and condensed water D is collected at the inclination lower end portion C. In this case, the inclination lower end portion C of the evaporator 21 is positioned at a vehicle rear side, and extends approximately in an entire length of the air inlet space 20b. Therefore, a position where the inclination lower end portion C of the evaporator 21 corresponds (i.e., overlaps) to the high pressure area E of the air inlet space 20b is only a part at the vehicle right side as shown in FIG. 5B, and a large part of the inclination lower end portion C is shifted from the high pressure area E.

Therefore, almost all of the condensed water D staying in the inclination lower end portion C can fall smoothly downwardly as shown by arrow F in FIG. 5B without being pushed by air pressure in the high pressure area E.

(The other Embodiment)

In the above-described embodiment, the rotation axis of the blower 14 of the blower unit is disposed approximately toward in the up-down direction, and the inside/outside air changeover box 11 is disposed at the upper side of the blower 14. However, the rotation axis of the blower 14 may be disposed toward in the vehicle front-rear side (horizontal direction), and the inside/outside air changeover box 11 may be disposed at a vehicle front side of the blower 14.

According to this arrangement, the inside/outside air changeover box 11 can be disposed at the same position level as the blower 14, the position of the outside air inlet 12 can be made lower as compared with the above-described embodiment. Thus, this arrangement is profitable when it is necessary to set the outside air inlet 12 at a low position in a vehicle.

Further, in the above-described embodiment, the evaporator 21 is a laminated type, but it is noted that the type of the evaporator is not limited thereto and may be a serpentine type with a multi-porous flat tube bent in a snake-like shape and combined with corrugated fins.

In the above-described embodiment, there is explained a double tank type evaporator 21 where the tank portions 21d, 21e are formed at both end portions of each tube 21a in the longitudinal direction B. The present invention, however, is applicable to an air conditioning apparatus having a single-tank type evaporator in which a tank portion (21d, 21e) is disposed only at one end portion of each tube 21 in the longitudinal direction.

Further, in the above-described embodiment, as shown in FIG. 3, the evaporator 21 is inclined so that the vehicle front side of the tubes 21 in the longitudinal direction B is made higher and the vehicle rear side thereof is made lower. However, reversely, the evaporator 21 is inclined so that the vehicle front side of the tubes 21 in the longitudinal direction B is made lower and the vehicle rear side thereof is made higher.

Further, a guide member for guiding the fall of condensed water may be disposed between the inclination lower end portion C of the evaporator 21 and the bottom portion 20c of the case 20 to facilitate the fall of the condensed water.

Further, instead of the evaporator 21 in which refrigerant of a refrigerant cycle flows, the present invention is applicable to a cooling heat exchanger in which cool water cooled by a cooling unit flows.

Further, in the above-described embodiment, there is described a front air conditioning apparatus in which the blower unit 1 and the air conditioning unit 2 are disposed at a lower portion of the instrument panel P at a front portion within the passenger compartment. However, the present invention is applicable to a rear air conditioning apparatus disposed at a rear side of the passenger compartment. In this case, it is point that the evaporator 21 is disposed so that the flow direction A of air flowing into the lower side of the evaporator 21 is perpendicular to the longitudinal direction B of tubes 21, and the other portions may be variably changed.

Further, in the above-described embodiment, as a temperature adjusting unit, the air mixing door 24 for adjusting a ratio between an amount of warm air passing through the heater core 22 and an amount of cool air passing through the bypass passage 23 is used. However, a hot water control valve (not shown) for controlling a flow amount of hot water flowing into the heater core 22 may be provided as the temperature adjusting unit, and air-heating amount is adjusted by the heater core 22 so that the temperature of air blown into the passenger compartment is adjusted.

FIELD OF INDUSTRIAL APPLICATION

The present invention is for improving draining performance of condensed water in a vehicle air conditioning apparatus in which air passes through a cooling heat exchanger from below upwardly, and is suitably applied to a vehicle air conditioning apparatus for reducing attachment space.

What is claimed is:

1. An air conditioning apparatus for a vehicle having a passenger compartment, said air conditioning apparatus comprising:

a case forming an air passage, said case defining a bottom portion; and a cooling heat exchanger, for cooling air passing therethrough, disposed in said case, wherein:

said cooling heat exchanger includes:

a core portion having a plurality of tubes extending in a longitudinal direction, through which a fluid flows to perform a heat exchange with air, and a tank portion for distributing the fluid into said tubes or for joining the fluid from said tubes, said tank portion being provided on one end of each tube in the longitudinal direction;

said cooling heat exchanger is disposed in said case to be inclined from a horizontal direction by a predetermined angle to define an upper end and a lower end so that air is introduced into said cooling heat exchanger from below and flows upwardly, said lower end of said cooling heat exchanger being spaced from said bottom portion of said case to form a lower space under said cooling heat exchanger;

said tank portion is positioned at said lower end of cooling heat exchanger;

said cooling heat exchanger is inclined in the same direction as the longitudinal direction of said tubes so that one end of said tubes in the longitudinal direction becomes lower than the other end of said tubes in the longitudinal direction;

said cooling heat exchanger is disposed so that a flow direction of air flowing into said lower space under said cooling heat exchanger is generally parallel to said cooling heat exchanger and approximately perpendicular to the longitudinal direction of said tubes;

said case has an air inlet through which said air is introduced into said lower space under said cooling heat exchanger, approximately horizontally;

said cooling heat exchanger is disposed at an upper side of said air inlet, said air introduced through said air inlet being directed to a position directly under the entire core portion but not to a position directly under said tank portion such that condensed water collected on said tank portion is not disturbed by said air introduced through said air inlet; and said air inlet is opened and extended to a position proximate to a boundary between said core portion and said tank portion in the longitudinal direction of the tubes.

2. The air conditioning apparatus according to claim 1, wherein:

said case has a drain hole for draining condensed water generated in said cooling heat exchanger; and said drain hole is provided generally beneath said lower end of said cooling heat exchanger.

3. The air conditioning apparatus according to claim 1, wherein:

said bottom portion is inclined to correspond to said cooling heat exchanger; and the drain hole is provided at a lowest position of said bottom portion.

4. The air conditioning apparatus according to claim 3, wherein said air inlet is provided between said cooling heat exchanger and said bottom portion in an up-down direction.

5. The air conditioning apparatus according to claim 1, further comprising:

a heating heat exchanger for heating air from said cooling heat exchanger, said heating heat exchanger being disposed on an upper side of said cooling heat exchanger, so that a bypass passage through which air bypasses said heating heat exchanger is provided; and an air mixing door, disposed between said cooling heat exchanger and said heating heat exchanger, for adjusting a ratio between an amount of air passing through said heating heat exchanger and an amount of air passing through said bypass passage.

6. The air conditioning apparatus according to claim 1, further comprising:

a blower unit for blowing air into said case, wherein said blower unit is disposed so that air blown by said blower unit flows approximately horizontally into said lower space under said cooling heat exchanger through said air inlet.

7. The air conditioning apparatus according to claim 1, wherein the air inlet has a dimension approximately equal to the tubes in the longitudinal direction.

8. The air conditioning apparatus according to claim 1, further comprising:

a heating heat exchanger disposed approximately horizontally in the case at an upper side of the cooling heat exchanger, wherein:

the case has a face opening through which air is blown toward an upper side in the passenger compartment, a defroster opening through which air is blown toward an inner surface of a front windshield, and a foot opening through which air is blown toward a lower side in the passenger compartment;

the face opening, the defroster opening and the foot opening are provided in the case at an upper side of the heating heat exchanger and downstream of the heating heat exchanger;

the face opening and the defroster opening are opened while being arranged approximately in an inclined direction of the cooling heat exchanger; and the face opening is opened at an inclined lower side of the cooling heat exchanger, with respect to the defroster opening.

9. The air conditioning apparatus according to claim 8, wherein the heating heat exchanger is disposed in the case to form a bypass passage at a vehicle rear side of the heating heat exchanger, through which air after passing through the cooling heat exchanger flows while bypassing the heating heat exchanger.

10. The air conditioning apparatus according to claim 1, wherein the air inlet is opened in the longitudinal direction of the cooling heat exchanger to extend approximately in a dimension range of the core portion in the longitudinal direction.

* * * * *